United States Patent [19]
Burdick et al.

[11] Patent Number: 5,844,027
[45] Date of Patent: Dec. 1, 1998

[54] STABILIZER COMPOSITION FOR THERMOPLASTIC MATERIALS

[75] Inventors: David Carl Burdick, Binningen, Switzerland; Stuart Frank Laermer, Wyckoff, N.J.; Sai-Shek Young, Sparkill, N.Y.

[73] Assignee: Ciba Specialty Chemicals Corporation, Tarrytown, N.Y.

Related U.S. Application Data

[60] Provisional application No. 60/016,817, May 3, 1996.

[21] Appl. No.: 847,976

[22] Filed: Apr. 21, 1997

[51] Int. Cl.$^6$ ........................................... C08K 5/15
[52] U.S. Cl. ........................ 524/110; 524/377; 524/448; 524/430; 524/492
[58] Field of Search .................................. 524/110, 377, 524/430, 448, 492

[56] References Cited

U.S. PATENT DOCUMENTS

| | | | |
|---|---|---|---|
| 4,451,604 | 5/1984 | Mills | 524/312 |
| 4,806,580 | 2/1989 | Bock et al. | 524/110 |
| 5,218,008 | 6/1993 | Parrish | 521/114 |
| 5,308,549 | 5/1994 | Laermer et al. | 252/399 |

FOREIGN PATENT DOCUMENTS

| | | |
|---|---|---|
| 0542108 | 5/1993 | European Pat. Off. . |
| 0613923 | 9/1994 | European Pat. Off. . |
| 2260764 | 4/1993 | United Kingdom . |

OTHER PUBLICATIONS

Derwent Abst. 94–272974/34

European Plastics News, Jul./Aug. 1996, vol. 23, No.7, p.37, "Vitamin E Available as a Powder".

*Primary Examiner*—Kriellion S. Morgan
*Attorney, Agent, or Firm*—Luther A. R. Hall

[57] ABSTRACT

A stabilizing system for plastic materials is disclosed. This system comprises a homogenous blend of alpha-tocopherol, optionally together with other additives and a polyolefin carrier which is a free flowing solid form. The free flowing solid form is easy to incorporate into plastic materials.

20 Claims, No Drawings

STABILIZER COMPOSITION FOR THERMOPLASTIC MATERIALS

CROSS-REFERENCE TO RELATED APPLICATIONS

This application claims the benefit under 35 U.S.C. § 119 (e) of provisional application Ser. No. 60/016,817, filed May 3, 1996.

BACKGROUND OF THE INVENTION

1. Field of the Invention

This invention relates to stabilizers for organic material susceptible to thermal, oxidative or/and light induced deterioration, in particular for thermoplastic material, and more specifically, to a novel stabilizing system containing alpha-tocopherol which improves the color and the processing stability of said materials.

Reducing oxidation, stabilizing the color, and stabilizing the melt viscosity of plastic materials during processing are important to the plastic industry. Plastics, during processing into articles, are subjected to high temperatures and pressures which can have an adverse affect on the molecular weight and physical properties of the polymer and appearance of the finished articles made from these plastics. The need exists, therefore, for antioxidant and color stabilizing materials which minimize oxidation and color instability, as well as deterioration induced by light.

Aside from its inherent safety (it is edible & GRAS) and its suitable physical properties, alpha-tocopherol, also known as vitamin E, is an effective scavenger of oxy radicals, such as hydroperoxyl, alkoxyl, hydroxyl, phenoxyl, etc. known. It is also a very reactive towards less electrophilic radicals such as alkyl, towards hydroperoxides, excited states of ketones, singlet oxygen, ozone, peroxide, nitrogen oxides, and other reactive species associated with oxidative damage. In many cases the relative reactivity of tocopherol has been found to be orders of magnitude higher than those of other phenolics. Its transformation products include materials which are also effective oxy radical and carbon radical scavengers.

It is an object of the present invention to provide a stabilizing system for use with organic materials to improve their color and processing stability. This object is achieved by adding to the materials a stabilizing system comprising (a) an effective amount of alpha-tocopherol, optionally together with other, in particular stabilizing, additives, and (b) a polyolefin carrier. The alpha-tocopherol, optionally together with the other stabilizing additives, is homogeneously blended with the polyolefin carrier to form a free flowing solid form.

The present invention is directed to a stabilizing system for organic material susceptible to thermal, oxidative or/and light induced deterioration comprising a blend of (a) alpha-tocopherol optionally together with other additives; and (b) a polyolefin carrier, wherein (a) is present in an amount of from 20 to 80 percent by weight based on the total weight of the system and (b) is present in an amount of from 80 to 20 percent by weight based on the total weight of the system. The blend is preferably solid and, in particular, homogeneous and free flowing. The other additives are preferably stabilizing additives. When the alpha-tocopherol is together with the other stabilizing additives, the other stabilizing additives can be present in an amount related to the ratio between alpha-tocopherol: other additives of from 1:10 to 10:1, in particular 1:1 to 10:1, preferably 3:1 to 7:1, for example 4:1 to 6:1.

Examples of other additives present in component (a), which are preferably stabilizing additives, are polyethylene glycol, glycerin, phosphites, thioesters and glycerides.

Preferably, the amount of alpha-tocopherol, optionally together with the other stabilizing additives (component (a)), is present in an amount of from 30 to 60 percent by weight based on the total amount of the system and the polyolefin carrier is present in an amount of from 70 to 40 percent by weight based on the total amount of the system. More preferably, the amount of alpha-tocopherol, optionally together with the other stabilizing additives, is present in an amount of from 40 to about 70 percent, for example 50 to 70, e.g. 55 to 65 percent, by weight based on the total weight of the system and the amount of polyolefin carrier is present in an amount of from 60 to 30 percent, for example 50 to 30, e.g. 45 to 35 percent, by weight based on the total weight of the system. Most preferably, the amount of alpha-tocopherol, optionally together with the other stabilizing additives being polyethylene glycol, is present in an amount of about 60 percent by weight based on the total weight of the system, polyethylene glycol is present in a ratio of about 5:1 alpha-tocopherol: polyethylene glycol, and the polyolefin carrier is present in an amount of about 40 percent based on the total weight of the system.

Preferably, the polyolefin carrier is polypropylene or polyethylene, in particular selected from the group consisting of polypropylene, high density polyethylene, linear low density polyethylene, low density polyethylene. A preferred polyolefin carrier is polypropylene.

The stabilizing system according to the instant invention may additionally contain, as component (c), a solid adsorbent, which is different from component (b) and which is preferably an inorganic, in particular mineral, adsorbent. Component (c) may be present, for example, in amounts of from 0.01 to 10, in particular 0.05 to 5, preferably 0.05 to 3 percent, based on the total weight of the composition.

Examples of substances to be used, alone or in any combination, as component (c) are silicic acids, diatomaceous earths, silica gels, silicates, clay minerals, activated aluminas, metal oxides and the like.

The silica gels employed are known per se and commercial products may, for example, be used. Particularly suitable silica gels are typically those having bulk densities of 0.4 to 0.8 g/ml, most preferably of 0.4 to 0.5 g/ml. Commercially available diatomaceous earth may be used, conveniently in liter weights of 150–300 g. The silicates may be the salts and esters of orthosilicic acid. The alkaline earth metal salts and, preferably, calcium and magnesium salts, of orthosilicic acid are further examples.

Further suitable adsorbents are the clay minerals, i.e. colloidal, finely particulate, anhydrous aluminium and/or magnesium silicates of the montmorillonite group. Such materials are also known as fuller's earth, Florida clay, attapulgite or bentonite. The cited adsorbents also include the aluminas, of which highly dispersed forms are preferred, γ-alumina being especially preferred.

The silicic acids which are known per se are particularly useful. It is especially preferred to use the powdered voluminous forms of silicic acid, the so-called precipitated silicic acids. These precipitated silicic acids have, for example, a pore volume of 2.5–15 ml/g and a specific surface area of 50–500 m$^2$/g. The pyrogenic or gas phase silicic acids are also preferred.

The adsorbent may be or contain further oxides, typically the alkali metal oxides or alkaline earth metal oxides or oxides of Al, Ti, Zr, Fe, Co or Ni. Examples are MgO, CaO, SrO or BaO, MgO, LiO$_2$, Na$_2$O, K$_2$O, and oxides of Ti and Fe. The adsorbent may also contain a mixture of such oxides.

Especially preferred is, as component (c), silica.

In addition, the present invention encompasses compositions containing an organic material susceptible to thermal, oxidative or/and light induced deterioration, and a stabilizing system according to the instant invention. The stabilizing system can be used at levels such that the concentration of alpha-tocopherol is present in an amount of from 10 to 3000, preferably 50 to 1000, in particular 50 to 300 ppm, based on the weight of the material. Preferably, the amount of the stabilizing system when used with polyethylene plastic materials, including high density, low density polyethylene, and linear low density polyethylenes, is advantageously used at levels such that the amount of alpha-tocopherol is present in an amount of from about 50 to about 200 ppm. Preferably, the amount of the stabilizing system when used with polypropylene plastic materials is used at levels such that the amount of alpha-tocopherol is present in an amount of from about 100 to about 300 ppm.

The organic material to be stabilized is preferably a synthetic polymer, in particular a plastic material, for example a thermoplastic material. Such polymer materials include, by way of example, polyolefins and their copolymers and mixtures, hydrocarbon resins, polystyrene, poly (α-methylstyrene), poly(p-methylstyrene) and their copolymers and graft copolymers, halogen containing polymers, polymers derived from α-β-unsaturated acids and their derivatives, homopolymers an copolymers of unsaturated alcohols or amines and of cyclic ethers; polyacetals, polyphenylene sulfides and -oxides, polyurethanes, polyamides, polyureas, polyesters, polycarbonates, polysulfones, crosslinked polymers, blends of such polymers and the like. Examples of such polymer materials are listed e.g. in U.S. patent specification No. 5,516,920, column 24, line 29 to column 27, line 55 (items 1 to 30), which passage is incorporated herein by reference. Particularly preferred are polyolefins.

With certain plastic materials, such as polypropylene for example, it is also advantageous to add one or more further stabilizers, in particular a phosphite to the plastic material in addition to the stabilizing system. In such a case, the ratio of the stabilizing system to phosphite is from about 1:1 to about 1:4. Preferably, the phosphite is selected from the group consisting of tris[2,4-di-tert-butylphenyl]phosphite and bis [2,4-di-t-butyl]pentaerythritol diphosphite. Additionally, the phosphite could be added as another stabilizing additive with the alpha-tocopherol as provided for herein.

By using the invention of the present application, there can be beneficial cost savings to the plastic industry because of the lower amount of an antioxidant needed to control color and melt viscosity during processing. Additionally, the stabilizing system is also easier to handle from a processing viewpoint since it is a free flowing solid blend.

As used herein, alpha-tocopherol refers to Vitamin E in general and more specifically to dl-alpha-tocopherol, also know as all racemic alpha-tocopherol, d-alpha-tocopherol, and R,R,R-alpha-tocopherol.

As used herein, synthetic polymers or plastic material refers to, among others, polyolefins including, but not limited to (1) polyethylene, including, but not limited to, high density polyethylene, low density polyethylene, linear low density polyethylene, and ultra high molecular weight polyethylene, which contain as one of the repeating units in a copolymer the polyethylene monomer moiety, or blends of polyethylene and one or more other polymers. Those skilled in the art will appreciate and will know how to make the different types of copolymers that can be formed with polyethylene, including alternating, block and graft copolymers as well as how to make the blends of polyethylene with other polymers; and (2) polypropylene, including homopolymers, copolymers which contain as one of the repeating units in a copolymer the polypropylene monomer moiety, or blends of polypropylene and one or more other polymers. Those skilled in the art will appreciate and will know how to make the different types of copolymers that can be formed with polypropylene, including alternating, block and graft copolymers as well as how to make the blends of polypropylene with other polymers. Plastic materials also include polyvinyl chlorides, styrene polymers, including copolymers thereof (for example, ABS and SAN), polyurethanes, polyacrylonitriles, acrylics, such as poly (methyl methacrylate), polyvinylidene chlorides, polyvinylidene fluorides, polytetrafuoroethylene, polyamides (for example, nylon 6 and nylon-6,6), polycarbonates, polyethylene terephthalates, elastomers, and polybutadienes.

Preferred polyolefins for the carrier of the stabilizing system are polypropylene, high density polyethylene, low density polyethylene, and linear low density polyethylene. Polypropylene is especially preferred.

As used herein, other additives can be envisioned to include polyethylene glycol, glycerin, phosphites, such as for example, tris[2,4-di-tert-butylphenyl]phosphite and bis [2,4-di-t-butyl]pentaerythritol diphosphite, thioesters, for example dilaurylthiodipropionate, distearylthiodipropionate; glycerides, such as for example, glyceryl monocaprylate/caprate, and the like where such stabilizing additives are used to stabilize color and melt viscosity of the plastic material during processing.

When used, the polyethylene glycol (PEG) can range from PEG-200 to PEG-1000, with PEG-400 being preferred.

The stabilizing system can comprise, as component (a), for example a formulation of alpha-tocopherol in an amount of from about 10 to about 50 percent by weight alpha-tocopherol; from about 16 to about 20 percent by weight of glycerin; from about 16 to about 50 percent by weight of polyethylene glycol; and from about 42 to about 50 percent by weight of glyceryl monocaprylate/caprate, where the amount of alpha-tocopherol and the other additives is from 20 to 80 percent by weight based on the total weight of the system and the polyolefin carrier present is from about 80 to about 20 percent by weight based on the total weight of the system.

The free flowing solid form can be in the form of a powder or a pellet, for example.

The stabilizing system can be made, for example, by adding the polyolefin carrier to a suitable mixer and melting it under a nitrogen blanket. Thereafter, the alpha-tocopherol, optionally together with the other stabilizing additives, is added to the melted polyolefin. The alpha-tocopherol, the optional other additives, and melted polyolefin are then mixed for a period of time (for example, about 15 minutes) at a temperature above the melting point of the polyolefin (about, for example, 200° C.). The materials are mixed until all the components are well blended. The mixture is then placed onto a chiller belt so as to form a sheet. The sheet is collected at the end of the chiller belt and then it is added to a cryogenic grinder and is ground into a fine, homogenous powder. The powder can be blended with a flow control agent, for example, silica (at about 1% by weight) to improve flow properties. For some of the examples below, the above procedure was used. PEG-400 was added as the other stabilizing additive and silica was used as a flow control agent in the preparation of the stabilizing system.

The stabilizing system can also be made from porous polyolefin pellets, for example, porous low density polyethylene or porous polypropylene, whereby alpha-tocopherol, and optionally the other additives, are stirred with the pellets until the alpha-tocopherol, and optionally the other additives, are absorbed. Thereafter, the pellets can be used without further processing. Some of the samples tested below were made using this procedure.

The methods of incorporating the stabilizing mixtures of the present invention into the organic material to be stabilized may be effected by the conventional methods which are generally used for the stabilization of such materials by additives. These methods are well known in the art and may involve the incorporation of the stabilizing system as such at any convenient stage of making or processing of the material.

In general, the stabilizing systems are particularly effective in stabilizing the organic material in which they are incorporated against undesired discoloration.

The following examples serve to illustrate the invention.

The plastic material to be tested (for example, polypropylene, high density polyethylene, or low density polyethylene) was made as follows:

1000 grams of unstabilized resin less 1 percent which was held in reserve (i.e., 990 grams) were placed into a suitable mixer. About 0.3 grams of the stabilizing system (about 300 ppm), as made as either a powder or pellet as discussed above, were added to the unstabilized resin held in reserve and this mixture was stirred until the materials were evenly dispersed. This mixture was then added to remaining 990 grams of unstabilized resin. The resulting mixture was blended until an even dispersion was achieved, about 10 to 15 minutes. The blended material was then added to an appropriate hopper and extrusion samples were then made.

All polymer substrates were subjected to multiple extrusions of five passes at 260° C. (500° F.) through a 35 mm (1 ⅜ in. D) conical co-rotating twin-screw extruder. The change in color (measured as yellowness index or Yl#, where # is the extrusion pass number) and melt flow rates (MFR or MF#, where # is the extrusion pass number) were measured according to ASTM procedures ASTM D-1925 and ASTM D-1238, respectively, the contents of which are hereby incorporated by reference. Unstabilized resins without the addition of the stabilizing system were extruded in the same manner and used as controls.

For melt flow rates, the materials to be evaluated were extruded five times with measurements taken at the first, third, and fifth passes.

For yellowness index measurements, 2 in.×2 in.×⅛ in. thick compression molded samples were tested according to the above ASTM procedure using a Hunter Lab spectrophotometer. A standard magnesium oxide plaque was used for the color measurements both as a calibration standard and as a background to the samples as provided for in the ASTM procedure. CIE light source C was used for the yellowness index measurements. Readings were made at the prescribed 2-degree "observer" angle. An average of 4 readings on each of the samples of the first, third and fifth pass plaques were taken.

EXAMPLES

Two types of solid systems were used:

1. As used in the examples below, "absorb" refers to stabilizing systems made where the additives were absorbed into a porous polymer (Porous LDPE or PP as the polyolefin carrier).
2. As used in the examples below, "grind" refers to stabilizing systems made where the additives and PP as the polyolefin carrier were melted together, solidified and then ground as provided for in the above process.

For example, "33% E+17% glycerol absorb on LDPE" means that 33 % of alpha-tocopherol and 17% of glycerol are absorbed on a porous LDPE carrier; "50% E+10% PEG 400 grind in PP" means that 50% alpha-tocopherol and 10% polyethyleneglycol 400 are melted together with polypropylene, solidified and ground as described above. Percentages refer to the total weight of the mixture obtained.

When the additive column reads "mix" this means the additives were mixed physically to the stabilizer system according to the invention (in cases where both grind and mix are listed, this means the solid "grind" was then physically mixed with the other component). For example, "50% E+10% PEG 400, grind in PP, mix with Irgf.-168 1:1 " means that 50% alpha-tocopherol and 10% polyethyleneglycol 400 are melted together with polypropylene, solidified and ground as described above. The stabilizer system thus obtained is then physically mixed with Irgafos 168 in a ratio of 1:1 before added to the polymer to be stabilized.

As used below, both "E" and "a-tocopherol" refer to dl-alpha-tocopherol. In addition, the term "CF-120" refers to a clear solution of alpha-tocopherol as mentioned above, the use and making of which is described in U.S. Pat. No. 5,308,549, in particular to the composition referred to in this patent as 202C-10 (columns ⅚, line 45). U-626 refers to bis[2,4-di-t-butyl]pentaerythritol diphosphite (also know as Ultranox 626, available from General Electric); and Irgf.-168 refers to tris[2,4-di-tert-butylphenyl]phosphite (also know as Irgafos 168, available from Ciba Specialty Chemicals Inc.).

EXAMPLE 1

A commercially available high density polyethylene-polypropylene copolymer (Chevron) was mixed with the additive and extruded five times at 260° C.

| ADDITIVE SYSTEM | AMOUNT | YI1 | YI3 | YI5 | MF1 | MF5 |
|---|---|---|---|---|---|---|
| a-tocopherol | 100 ppm | 2.9 | 5.2 | 5.9 | 29.6 | 28.5 |
| 50% E absorb on LDPE | 200 | 0.6 | 1.2 | 1.0 | 30.0 | 26.9 |
| 50% CF-120 absorb on LDPE | 1000 | −3.0 | −2.0 | −1.9 | 28.3 | 29.9 |
| 25% E + 25% glycerol, absorb on LDPE | 400 | −2.2 | −1.3 | −1.2 | 30.3 | 27.3 |
| 33% E + 17% glycerol, absorb on LDPE | 300 | −2.7 | −1.6 | −1.4 | 29.1 | 26.6 |
| 40% E + 10% glycerol, absorb on LDPE | 250 | −2.5 | −1.5 | −1.3 | 29.7 | 27.7 |
| 43% E + 7% glycerol, absorb on LDPE | 233 | −2.3 | 0.6 | −0.1 | 28.2 | 25.9 |
| 46% E + 5% glycerol, absorb on LDPE | 220 | −0.9 | 0.2 | 0.0 | 28.3 | 26.8 |

| ADDITIVE SYSTEM | AMOUNT | YI1 | YI3 | YI5 | MF1 | MF5 |
|---|---|---|---|---|---|---|
| 49% E + 10% PEG 400 + 1% silica, absorb on LDPE | 220 | −0.8 | 0.6 | 0.5 | 28.5 | 25.8 |

EXAMPLE 2

| Polymer: HDPE-PP copolymer as Example 1 | | | | | | |
|---|---|---|---|---|---|---|
| a-tocopherol | 100 | 1.7 | 2.0 | 2.6 | 28.8 | 33.5 |
| E/PEG 400 mix 5:1 w/w | 120 | −1.3 | 0.3 | 1.4 | 30.4 | 30.2 |
| 50% E absorb on PP | 200 | 1.7 | 1.9 | 2.5 | 27.8 | 28.9 |
| 25% E + 25% PEG 400, absorb on PP | 400 | −2.8 | −1.8 | −0.3 | 28.4 | 28.7 |
| 33% E + 17% PEG 400, absorb on PP | 300 | −2.2 | −1.0 | 0.2 | 26.7 | 31.5 |
| 42% E + 8% PEG 400, absorb on PP | 239 | −1.1 | −0.5 | 0.5 | 28.8 | 29.6 |
| 44% E + 6% PEG 400, absorb on PP | 225 | −1.1 | −0.1 | 1.0 | 27.8 | 31.1 |
| 30% E + 15% PEG 400, absorb on PP | 300 | −1.8 | −0.5 | 0.5 | 25.5 | 29.5 |
| 30% E + 6% PEG 400, absorb on PP | 300 | −1.7 | −0.3 | 0.8 | 26.4 | 26.3 |

EXAMPLE 3

| Polymer: HDPE copolymer with PP (Chevron) | | | | | | |
|---|---|---|---|---|---|---|
| a-tocopherol | 100 | 2.2 | 3.0 | 4.2 | 35.6 | 37.4 |
| E plus PEG 400 5:1 liquid mix | 120 | −0.5 | 1.6 | 2.0 | 37.2 | 33.8 |
| 30% E absorb on PP | 330 | −2.1 | −1.0 | −0.2 | 37.7 | 34.5 |

EXAMPLE 4

| LDPE (Rexene) extruded at 260° C. | | | | |
|---|---|---|---|---|
| a-tocopherol | 100 | −2.2 | −1.3 | 0.1 |
| 50% E + 10% PEG 400, absorb on PP | 120 | −3.4 | −2.6 | −1.8 |

EXAMPLE 5

| Polymer: HDPE (Chevron) homopolymer at 260° C. | | | | | | |
|---|---|---|---|---|---|---|
| a-tocopherol | 100 | 3.3 | 3.7 | 4.0 | 0.71 | 0.67 |
| 42% E absorb on PP | 240 | 0.2 | 0.9 | 0.9 | 0.73 | 0.62 |
| 50% E grind in PP | 200 | 0.4 | 1.4 | 1.6 | 0.76 | 0.67 |
| 50% E + 10% PEG 400, grind in PP | 200 | −1.1 | −0.7 | −0.1 | | |
| 50% E + 10% PEG 400, grind in PP | 300 | −1.8 | −0.5 | −0.1 | | |

EXAMPLE 6

| Polymer: Polypropylene (Epsilon) plus 0.05% calcium stearate at 260° C. | | | | | | |
|---|---|---|---|---|---|---|
| blank | | 2.4 | 2.9 | 4.5 | | |
| 50% E grind in PP | 400 | 6.0 | 8.7 | 10.6 | 9.0 | 10.4 |
| 50% E grind in PP, mix with U-626 1:1 | 800 | 4.7 | 5.9 | 6.8 | 8.1 | 8.4 |
| 50% E + 10% PEG 400, grind in PP | 400 | 5.5 | 7.0 | 8.5 | 9.2 | 12.0 |
| 48% E + 10% PEG 400 + 2% silica, grind in PP | 400 | 5.2 | 6.9 | 8.1 | 8.8 | 11.8 |
| 50% E, grind in PP, mix with U-626 1:1 | 600 | 4.5 | 6.3 | 7.5 | 8.0 | 8.8 |
| 50% E, grind in PP, mix with Irgf.-168 1:1 | 800 | 6.2 | 8.2 | 9.3 | 8.6 | 9.4 |
| 50% E, grind in PP, mix 1:1 with U-626 | 400 | 4.7 | 5.9 | 6.8 | 8.1 | 8.4 |

EXAMPLE 7

| Polymer: Polypropylene (Epsilon) plus 0.05% Ca stearate at 260° C. | | | | | | |
|---|---|---|---|---|---|---|
| blank | | 2.3 | 3.6 | 4.4 | 15.1 | 36.5 |
| 50% E + 10% PEG 400, grind in PP | 400 | 5.8 | 6.2 | 8.6 | 11.7 | 12.7 |
| 50% E + 10% PEG 400, grind in PP, mix with Igrf.-168 1:1 | 800 | 5.0 | 6.2 | 6.7 | 8.6 | 9.2 |
| 50% E + 10% PEG 400, grind in PP, mix with U-626 1:1 | 600 | 3.4 | 4.3 | 5.2 | 8.2 | 8.3 |
| 50% CF-120 grind in PP | 2000 | 5.5 | 7.7 | 8.9 | | |

EXAMPLE 8

| Polymer: Polypropylene (Epsilon) plus calcium stearate 0.05% at 260° C. | | | | | | |
|---|---|---|---|---|---|---|
| blank | | 2.4 | 2.9 | 4.5 | 18.3 | 33.9 |
| 50% E grind in PP | 400 | 6.0 | 8.7 | 10.6 | 9.0 | 10.4 |
| 50% E, grind in PP, mix 1:1 with U-626 | 800 | 4.7 | 5.9 | 6.8 | 8.1 | 8.4 |
| 50% E + 10% PEG 400, grind in PP | 400 | 5.5 | 7.0 | 8.5 | 9.2 | 12.0 |

-continued

Polymer: Polypropylene (Epsilon) plus calcium stearate 0.05% at 260° C.

| | | | | | |
|---|---|---|---|---|---|
| 50% E + 10% PEG 400, grind in PP, mix 1:1 with U-626 | 800 | 4.0 | 5.5 | 8.9 | 8.2 8.5 |
| 50% E + 10% PEG 400, grind in PP, mix 2:1 with U-626 | 600 | 4.1 | 6.7 | 8.2 | 8.0 9.3 |
| 50% E + 10% PEG 400, grind in PP, mix 1:1 with U-626 | 600 | 3.8 | 5.5 | 6.6 | 8.1 8.6 |
| 50% E, grind in PP, mix 1:1 U-626 | 600 | 4.5 | 6.3 | 7.5 | 8.0 8.8 |

EXAMPLE 9

Polymer: HDPE (Fina) plus 0.25% calcium stearate at 500° F.

| | | | | |
|---|---|---|---|---|
| blank | | 3.9 | 9.1 | 11.8 |
| CF-120 | 1000 ppm | −1.5 | 2.8 | 5.6 |
| 50% CF-120 absorb on PP | 2000 | 0.9 | 0.8 | 3.2 |
| 33% E, absorb on PP, mix 1:1 with U-626 | 1400 | −1.0 | 0.8 | 2.5 |

EXAMPLE 10

Polymer: HDPE-PP copolymer (Chevron) at 500° F.

| | | | | | | |
|---|---|---|---|---|---|---|
| blank | | −4.3 | 0.5 | 2.0 | 0.21 | 0.15 |
| E | 50 | −0.9 | 2.2 | 3.3 | | |
| 50% E absorb on LDPE | 100 | −0.6 | 0.6 | 1.3 | | |
| E | 100 | 0.7 | 1.5 | 2.5 | 0.30 | 0.32 |
| 50% E absorb on LDPE | 200 | 0.8 | 1.2 | 2.1 | 0.29 | 0.31 |
| CF-120 | 300 | −4.0 | −2.3 | −1.5 | 0.30 | 0.32 |
| 50% CF-120 absorb on LDPE | 600 | −4.3 | −3.0 | −2.0 | 0.31 | 0.30 |

As used above, PP refers to polypropylene, HDPE refers to high density polyethylene, LDPE refers to low density polyethylene. Where, for example, E, a-tocopherol, and CF-120 are not absorbed on or ground with a polyolefin carrier, this indicates that they were added as liquid additives.

What is claimed is:

1. A stabilizing system for organic material susceptible to thermal, oxidative or/and light induced deterioration comprising a blend of (a) alpha-tocopherol optionally together with other additives; and (b) a polyolefin carrier, wherein (a) is present in an amount of from 20 to 80 percent by weight based on the total weight of the system and (b) is present in an amount of from 80 to 20 percent by weight based on the total weight of the system.

2. The stabilizing system of claim 1 wherein the other additives are present in an amount based on the ratio of alpha-tocopherol to other additive, wherein the ratio of alpha-tocopherol to the other additive is from 1:10 to 10:1.

3. The stabilizing system of claim 2 wherein the ratio is from 1:1 to 10:1.

4. The stabilizing system of claim 2 wherein the other additive is selected from the group consisting of polyethylene glycol, glycerin, phosphites, thioesters and glycerides.

5. The stabilizing system of claim 4 wherein the other additive is polyethylene glycol.

6. The stabilizing system of claim 5 wherein the ratio of alpha-tocopherol to polyethylene glycol is 4:1 to 6:1.

7. The stabilizing system of claim 1 wherein (a) is present in an amount of from 40 to 70 percent by weight of the system.

8. The stabilizing system of claim 7 wherein (a) is present in an amount of from 55 to 65 percent by weight.

9. The stabilizing system of claim 1 wherein the polyolefin carrier is polyethylene or polypropylene.

10. The stabilizing system of claim 9 wherein the polyolefin carrier is selected from the group consisting of polypropylene, high density polyethylene, low density polyethylene, and linear low density polyethylene.

11. The stabilizing system of claim 1 wherein (a) is present in an amount of from 30 to 60 percent by weight and (b) is present in an amount of from 70 to 40 percent by weight.

12. The stabilizing system of claim 11 wherein (a) is present in an amount of from 50 to 70 percent by weight.

13. The stabilizing system of claim 3 wherein the ratio of alpha-tocopherol to the other stabilizing additive is from 3:1 to 7:1.

14. The stabilizing system of claim 1 which additionally contains a solid adsorbent (c).

15. The stabilizing system of claim 14 wherein (c) is present in an amount of from 0.01 to 10 percent by weight of the system.

16. The stabilizing system of claim 15 wherein (c) is present in an amount of from 0.05 to 5 percent by weight.

17. The stabilizing system of claim 14 wherein (c) is selected from the group comprising silicic acids, diatomaceous earths, silica gel, silicates, clay minerals, activated aluminas and metal oxides.

18. A composition containing an organic material susceptible to thermal, oxidative or/and light induced deterioration and, as a stabilizer, a system according to claim 1.

19. The composition of claim 18 wherein the organic material is a synthetic polymer.

20. A method of stabilizing an organic material susceptible to thermal, oxidative or/and light induced deterioration which comprises incorporating therein a stabilizer system according to claim 1.

* * * * *